United States Patent [19]

Collins

[11] 4,291,775
[45] Sep. 29, 1981

[54] METHOD AND APPARATUS FOR IMPROVING WEIGHING ACCURACY

[75] Inventor: Michael J. Collins, Matthews, N.C.
[73] Assignee: CEM Corporation, Indian Trail, N.C.
[21] Appl. No.: 90,286
[22] Filed: Nov. 1, 1979
[51] Int. Cl.³ ............................................. G01G 21/28
[52] U.S. Cl. ........................................ 177/1; 73/15 B; 73/76; 177/238; 177/245; 219/10.55 E; 219/10.55 M
[58] Field of Search ................... 177/1, 180, 190–198, 177/238, 245; 219/10.55 R, 10.55 M, 10.55 F, 10.55 E; 73/15 B, 76

[56] References Cited

U.S. PATENT DOCUMENTS

| | | | |
|---|---|---|---|
| 3,292,417 | 12/1966 | Hayden | 73/15 B |
| 3,890,825 | 6/1975 | Davis | 73/15 B |
| 4,142,403 | 3/1979 | Lohnes | 73/76 |
| 4,165,633 | 8/1979 | Raisanen | 73/76 |

*Primary Examiner*—Joseph W. Hartary

[57] ABSTRACT

A method and apparatus is described for improving the weighing accuracy of sensitive automatic balances when weighing heated substances. This is accomplished by substantially eliminating or reducing convection currents from interfering with and fluctuating the weight being sensed. An air barrier shield is used to cover the balance plate without contacting or touching the balance, thereby eliminating convection air currents from interfering with the movement of the balance. The air barrier is permeable to microwave radiation and capable of absorbing moisture and other volitilized substances while being substantially impermeable to air currents. Glass fiber matting or padding is particularly useful for forming the air barrier enclosure. The invention is particularly applicable to analytical determinations which require microwave heating of the substance to remove volatiles and the requirement to accurately and sensitively weigh the substances while still hot using an electrical balance.

9 Claims, 1 Drawing Figure

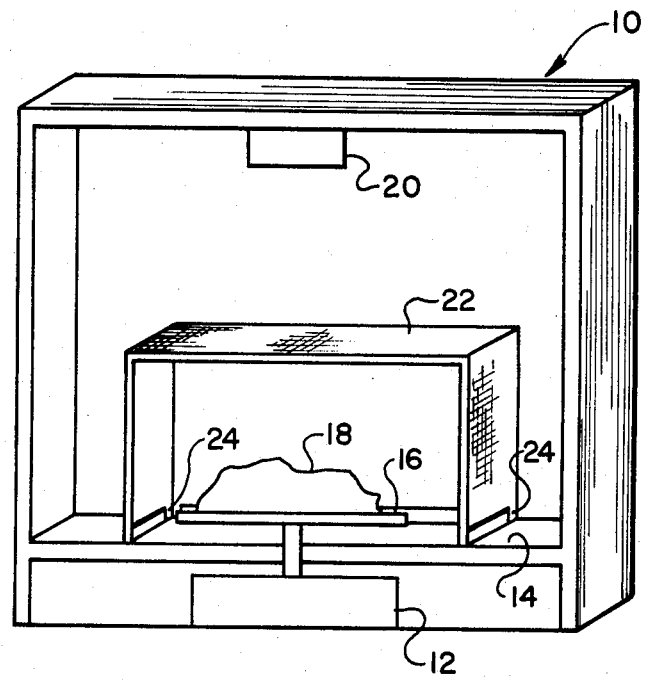

METHOD AND APPARATUS FOR IMPROVING WEIGHING ACCURACY

BACKGROUND OF THE INVENTION

This invention is directed to a method and apparatus for improving the weighing accuracy of hot substances being weighed on sensitive analytical type balances and more particularly the invention is directed to an apparatus and method which reduces or eliminates convection currents generated by the volatilization of moisture and/or solvents from heated substances, thereby enabling accurate weighings to be made without first cooling the substance.

In recent years, analytical procedures have been developed for high speed quantitative analysis of various agricultural commodities, food stuffs, dairy products, paints, coatings, paper products, tobacco and the like which require the volatilization of moisture or solvents from the substance. These procedures utilize microwave heating of a small quantity of material being analyzed to remove various volatiles such as solvents and/or moisture followed by calculations of the amount of moisture, solids or other residuals and losses which are being determined. The methods require initially weighing the substance followed by microwave heating to volatilize low boiling components such as solvents, moisture, etc., followed by reweighing and perhaps other procedural steps. To accomplish these weighings in a rapid and accurate manner, the substance is not removed from the balance but rather weighed in place after each succeeding step. Preferably, the weight of the substance is sensed or measured repeatedly during the microwave heating while volatiles are still being removed from the heated substances and when complete dryness is obtained. Such procedures not only require highly sensitive balances but also sensing the weight while the substance is still hot.

It is well known that heated substances generate convection currents which cause air flows around the heated substance. These air currents substantially affect the weighing accuracy of sensitive electrical balances. To obtain the required accuracy for such analytical procedures, weighing accuracies in the range of plus or minus 0.10 milligrams is often required. At the required degree of accuracy, convection currents can substantially affect the measured results and widen the limits of reproducibility.

It is therefore an object of the present invention to provide a method and apparatus for substantially improving the accuracy of weighing heated substances on sensitive balances.

It is a further object of the present invention to provide an enclosure which arrests convection currents but yet is permeable to microwave radiation and permits the sensing of weights while still subjecting the substance to heating.

It is another object of the present invention to provide an air barrier enclosure which substantially eliminates convection currents generated by heated substances while aiding in the removal of volatiles.

It is yet another object of the present invention to provide a method for reducing or eliminating convection current influences on automatic balance weighings while at the same time permitting the heating of the substance on the balance in situ.

These and other objects of the present invention will become more apparent from the description of the invention which follows.

THE INVENTION

In accordance with the invention, an apparatus is provided for improving analytical balance accuracy in weighing heated materials comprising balance plate cover means, said cover means being composed of air barrier material permeable to microwave radiation and absorbent of volatilized vapors, said cover means being sized to cover and enclose an analytical balance plate without contacting the same.

The apparatus provides a method for improving analytical balance accuracy in weighing heated materials comprising placing a material to be weighed on the balance plate of an analytical balance, covering and enclosing said balance plate with a preformed air barrier, heating said material while on said balance to remove volatiles and sensing the weight of said heated material while at a temperature above ambient temperature.

The present invention provides a simple method for permitting rapid successive weighings of both hot and cold substances without waiting for the substance to cool prior to weighing. In analytical procedures which require sensitive weighings on the order of plus or minus 0.10 milligrams, the present invention permits accurate weighing, particularly on analytical electrical balances, without fluctuation of the weight readings while the substance is still being heated or in the heated condition.

BRIEF DESCRIPTION OF THE DRAWING

The FIGURE is a diagramatic showing of the invention in a microwave oven for weighing heated materials.

DETAILS OF THE INVENTION

The present invention utilizes the fact that polar substances such as moisture are heated and volatilized by microwave radiation and once in the vapor state, these substances are no longer effected by the radiation in the preferred frequency. Polar vapors do not absorb microwave radiation in the frequency range of about 900 to 6000 megahertz, which are the preferred freqnencies. More particularly, a frequency of about 2450 megahertz is emitted by commonly used magnetrons. Thus, volatiles being vaporized from the heated substance are no longer heated once in the volatile state. As such, these volatiles condense on the barrier material of the present invention and are absorbed therein.

By using an absorbent barrier material, the condensed moisture wicks through the barrier to the outer side away from the balance plate. Once in the condensed state, the polar condensates are again absorbent of microwave radiation and thereby revolatilized from the barrier. This takes place without creating air currents which otherwise would effect the weighing of the substance on the balance.

The present invention will be more clearly described by reference to the drawing, which is a sectional view of an analytical instrument having an electrical balance positioned within a microwave oven 10. Microwave oven 10 has positioned therein electronic balance 12 situated below the floor 14 of microwave oven 10. Projecting through floor 14 connected to electronic balance 12 is balance plate 16 which is in the oven proper.

Sample of material 18 to be quantitatively analyzed for volatiles is placed on balance plate 16.

Radiant heating means, more preferably microwave radiation from a source such as a magnetron, is directed into oven 10 through inlet 20. Suitable reflectors, mixers, wave guides, radiation absorbers and the like are preferably provided so as to disperse microwave radiation towards material 18 on balance plate 16.

Barrier 22 comprises a box-like structure, cone or dome which fits within microwave oven 10 resting on floor 14. Barrier 22 is sized so as to avoid contact with balance plate 16 or material 18 when placed in position but otherwise its shape is not critical. Barrier 22 preferably rests on legs or a support which elevates the same slightly above floor 14 thereby permitting ingress and egress of vapors. The legs 24 or support means are preferably of size so as to elevate barrier 22 to a position not approximately exceeding the level of balance plate 16.

Barrier 22 is permeable to microwave radiation and absorbent of moisture and solvent vapors. It is sufficiently impermeable so as to restrict the flow of low pressure air such as is generated by convection currents and the volatilization of moisture and solvents. Materials which yield such permeability are microwave radiation transparent materials such as paper, natural and synthetic fibers such as nylon, polyesters, cellulose acetate and triacetate, acrylics, cotton, wool, flax and the like, glass fibers, Teflon fibers, polypropylene fibers and the like fibrous materials. Such materials additionally do not decompose when subjected to microwave radiation and are absorbent to moisture and solvents. In addition to fibers, sheet material of the same substances which are absorbent to the volatilized vapors can be used, i.e., paper. Fiber materials are, however, generally preferred.

The fiber can be either in the form of woven or nonwoven structures. Typically, woven glass fiber materials are readily available and are often preferred. In addition, nonwoven padding or matting function extremely well.

The preferred fibrous material is glass fiber due to the manner in which moisture and solvents permeates through barrier 22 when subjected to microwave radiation. With a glass fiber barrier, the rate of moisture loss from material 18 is enhanced because a humidity buildup is not generated under barrier 22 which might otherwise reduce the rate of moisture or solvent loss from material 18. The glass fiber material tends to transpose moisture from the interior surface of the barrier to the exterior surface by a condensation re-evaporation mode which tends to favor the analytical procedures being utilized. Although glass fibers are the preferred material, for certain other determinations, for instance where solvents rather than moisture are present, other materials of the type indicated above may be preferred for that particular determination.

The shape of barrier 22 is not critical. The drawing illustrates a box-shaped barrier merely for ease of illustration and convenience. In fact, box-shaped barriers in many instances may be more readily constructed. However, dome or cone shapes or any other shape may be more conveniently used, depending upon the positioning of the balance in relationship to the space available in a given microwave oven.

While the present invention has been described more particularly with respect to a microwave oven, it is clear that the barrier of the present invention could be utilized with other heating means such as radiant or ultraviolet wave heating. In addition, while a microwave oven is preferred, wave guides which are in fact microwave ovens can be substituted to obtain correspondingly good results.

While the invention has been described more particularly with respect to its preferred embodiments, it will be recognized by those skilled in the art that various changes therein can be made without departing from the spirit and scope of the invention. It is therefore intended that the invention be disclosed and claimed broadly in keeping with the contribution to the art.

What is claimed is:

1. A method for improving analytical balance accuracy in weighing heated materials comprising placing a material to be weighed on the balance plate of an analytical balance, covering and enclosing said balance plate without contacting the same with a preformed air barrier transparent to microwave radiation heating said material with microwave radiation while on said balance to remove volatiles, collecting and/or absorbing said volatiles on said barrier and sensing the weight of said heated material while at a temperature above ambient temperature.

2. The method of claim 1 wherein the analytical balance is an electrical balance.

3. The method of claim 2 wherein the preformed air barrier is absorbent of moisture vapor and permeable to microwave radiation.

4. The method of claim 1 wherein the weight is sensed periodically during the heating.

5. An apparatus for improving analytical balance accuracy in weighing heated materials comprising balance plate cover means, said cover means being composed of air barrier material permeable to microwave radiation and absorbent of volatilized vapors, said cover means being sized to cover and enclose an analytical balance plate without contacting the same.

6. The apparatus of claim 1 wherein the cover means is in the shape of a box or dome.

7. The apparatus of claim 1 wherein the cover means has means for retaining the same in an elevated position at about the level of the balance plate.

8. The apparatus of claim 1 wherein said cover means is constructed of Teflon fibers and supports.

9. The apparatus of claim 1 wherein said cover means is constructed of glass fiber cloth or matting.

* * * * *